United States Patent [19]

Pillars

[11] 4,186,940

[45] Feb. 5, 1980

[54] LOCKING-BALL FOR TRAILER HITCH

[76] Inventor: Arthur W. Pillars, Clearwater Rd., Star Rte. B, Satsuma, Fla. 32089

[21] Appl. No.: 11,119

[22] Filed: Feb. 12, 1979

[51] Int. Cl.² ............................................. B60D 1/06
[52] U.S. Cl. ............................................... 280/507
[58] Field of Search ...................... 280/507, 511, 512; 70/166, 170

[56] References Cited

U.S. PATENT DOCUMENTS

| | | | |
|---|---|---|---|
| 1,978,859 | 10/1934 | Draeger | 280/511 |
| 3,226,133 | 12/1965 | Geresy | 280/507 |
| 3,237,969 | 3/1966 | Geresy | 280/507 |
| 3,391,555 | 7/1968 | Mamo | 280/507 |
| 3,410,580 | 11/1968 | Longenecker | 280/507 |
| 3,526,110 | 9/1970 | Foote | 280/507 |
| 3,810,664 | 5/1974 | Nunnink | 280/507 |
| 3,820,823 | 6/1974 | Beaston | 280/512 |
| 3,977,221 | 8/1976 | Foote | 280/507 |

*Primary Examiner*—Richard A. Bertsch
*Assistant Examiner*—Randall A. Schrecengost
*Attorney, Agent, or Firm*—Alfred D. Lobo

[57] ABSTRACT

This invention is designed to lock a trailer coupling, which includes a trailer hitch of the lever type and a ball-type connector. The coupling is locked by a locking-ball which is constructed by modifying a conventional ball to conceal the locking element, and how it provides the locking function. The locking-ball includes a substantially spherical ball in which a hardened steel bolt is threadedly disposed axially therewithin for vertical axial movement of the bolt through the upper surface of the locking-ball. The locking-ball is inserted in the socket of the trailer hitch, and the lever is closed in the "down" position so as to actuate a cam against a jaw, which jaw in cooperation with the socket, snugly holds the ball in position. The bolt is then advanced vertically by a key in mating relation with the lower end or head of the bolt, until the upper end of the bolt is forced against the inner surface of the socket, and the ball is forcibly biased within the socket against the jaw. When the ball is forcibly thus biased, it is held immovably in the socket, the lever cannot be raised, and the trailer hitch cannot be opened to permit the insertion of another ball.

7 Claims, 6 Drawing Figures

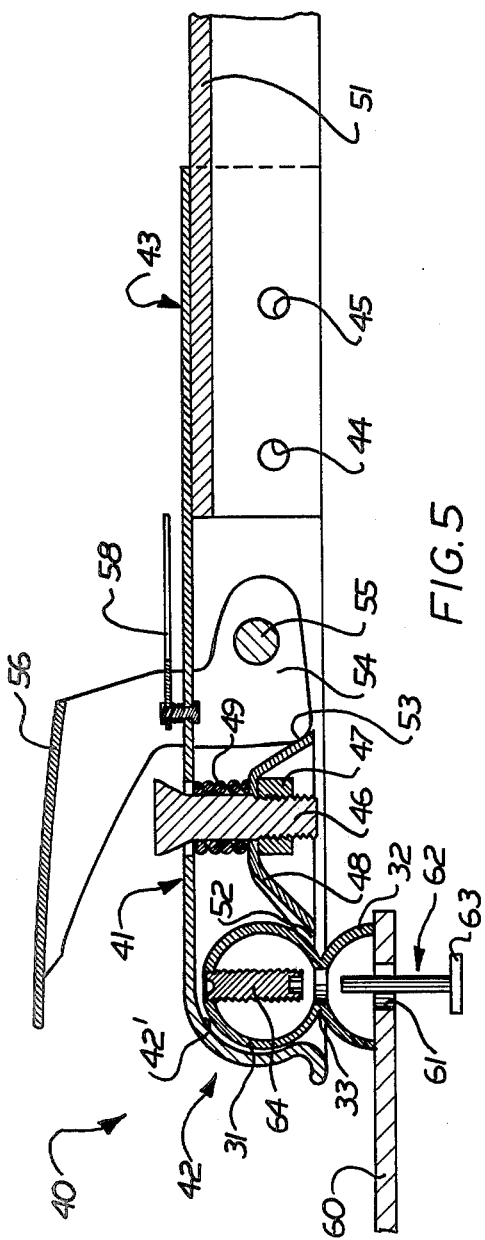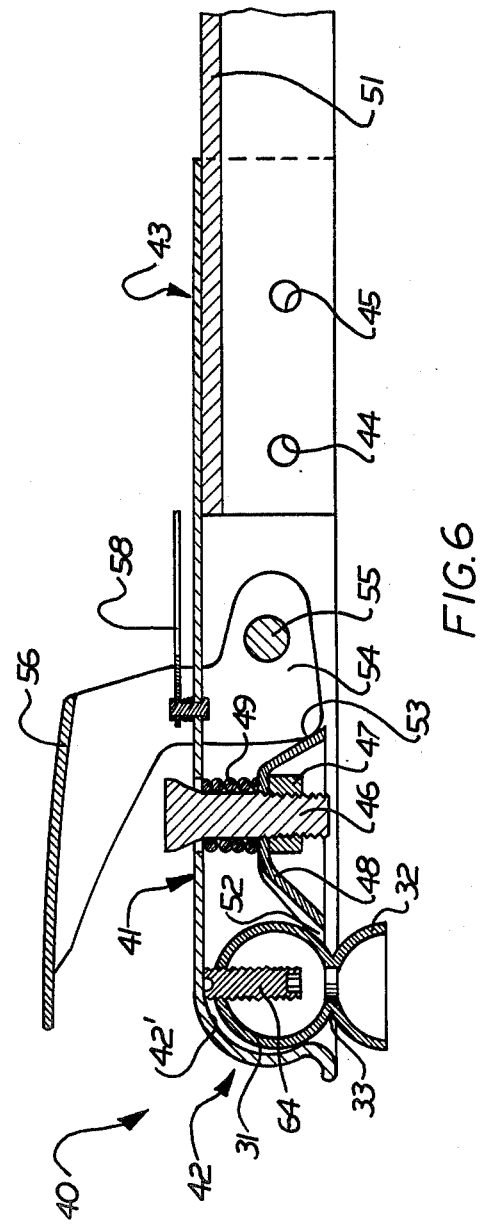

LOCKING-BALL FOR TRAILER HITCH

BACKGROUND OF THE INVENTION

The spur of the moment theft of a trailer by an occasional malevolent or impecunious miscreant has long since been supplanted by the organized theft of mainly the most desirable trailers, by determined if not professional thieves. Thus, over the past decade or more, a plethora of locking devices have been offered to owners of trailers, to discourage, if not prevent the stealing of trailers by trailer thieves.

Locking devices fall into two main categories which may be described as follows:

A. Those devices in which it is immediately evident how the locking function is accomplished, and the degree of effort that will likely be required to defeat the locking mechanism without rendering the hitch unserviceable.

B. Those devices in which the general means of locking the hitch is not readily evident. It is difficult to discover how the locking means operates, and therefore, how to defeat it.

In devices falling in category A the thief can estimate the time, the tools and the type of skillful effort which will be required to defeat the locking mechanism, and then more or less predictably assess the risk of executing his task. An obviously abundantly fortified hitch will pose so evidently formidable a challenge that it will generally invite no more than fleeting interest on the part of the thief. In category B, the thief must take the time to make a relatively close examination of unpredictable duration just to analyze how the mechanism works, correctly conclude how it does, and then formulate a plan to defeat it. A successful locking device in either category forces the thief to turn his attention to a hitch which appears to be unprotected by a locking device.

When under the foregoing circumstances, the thief seeks an apparently unprotected trailer hitch, and encounters a trailer hitch which utilizes the instant invention, he is surprised to find it is locked. His initial scrutiny reveals there is no visible locking means, adding to his surprise. Finally, when an even further scrutiny reveals that the locking means is effectively concealed; that, access to what appears to be the locking member cannot be gained with conventional tools; and, that the end of the locking member, which end is only visible by looking upwards from an essentially supine position on the ground below the hitch, requires a special key means, his surprise gives way to a realization that his attention will be more profitably transferred to a less arcane challenge.

The locking means of this invention comprises a locking-ball in which is concealed a threaded bolt, so as to give the impression that the hitch is unprotected. It neither advertises that it is highly secure, nor that it is locked at all, yet upon close examination reveals a locked mechanism with no visible locking means, and no visible modification of either the hitch, or what appears to be a conventional ball. Even after a thief acquaints himself with the device, the obvious difficulty of successfully defeating it within a reasonable period of time without damaging the hitch, inspires in a prospective thief a reluctance to risk an attempt to defeat the device. This device clearly does not belong in category A, and is more likely to be classified in category B.

Some prior art devices lock the trailer hitch to the conventional ball carried by the tow vehicle. Such devices protect the trailer from being disconnected from the tow vehicle when both are parked, and left unattended. These devices generally also protect the trailer when it is disconnected, this protection being typically provided by inserting a spare ball as a plug in the spherical socket of the hitch. The hitch is closed with a lever, hand-wheel or other cam-actuating means, and then the closed hitch is locked with the locking device. Some typical such devices are disclosed in U.S. Pat. Nos. 3,391,555; 3,514,980 and 3,820,823 inter alia.

Other prior art devices are specifically designed to protect a trailer which has been disconnected from its tow vehicle. Typical of such devices are plugs, or devices which effectively bar access of a ball into the socket of the trailer hitch. Such devices are those disclosed in U.S. Pat. Nos. 3,226,133; 3,526,110; 3,810,664; and 3,977,210 inter alia. Though this invention can be used in the former category, that is to lock the trailer hitch to the ball, while the hitch and ball couple the tow-vehicle and trailer, it is more specifically directed to locking the trailer hitch after the tow vehicle is uncoupled.

It should be borne in mind that the thief for whom this invention is conceived, can steal a trailer, no matter how carefully it is secured, if the thief is given more than sixty seconds of reasonably assured quiet and inattention. Under such a circumstance, even a hasp (saddle member) of the locking device of U.S. Pat. No. 3,391,555 presents no serious obstacle to a chisel or cutting torch. Exposed parts and locks, as recognized in U.S. Pat. No. 3,526,110 are vulnerable to a force sufficient to deflect or break them, yet insufficient to damage the trailer hitch so that it can still be used to tow the trailer away. Even a heavy padlock used in the device of U.S. Pat. No. 3,237,969 is easily cut with a portable torch, or is susceptible to being defeated by acid poured into the lock. Alternatively, the lock is frozen by a cryogen until the hasp is brittle, and then the hasp is fractured. These nowstandard tampering techniques are favored because they are quiet and quick, and do not require carrying a miniature oxy-acetylene or similar torch, or other specialized tools, the possession of which may be a little difficult to explain to law enforcement authorities.

As has been stated, and as will be readily recognized, a proficient thief, given enough time, can mount a determined assault on any locked trailer hitch and successfully force it to yield its prize. A trailer hitch deemed sufficiently secure, would be one which dissuades such an assault in the first place. The only theft-proof trailer hitch is the unassaulted hitch. If the hitch does not always succeed in dissuading an assault, it should be eminently evident that a successful assault will necessitate more time than a thief might reasonably plan to allot, and, that the assault will necessarily attract more attention than the thief is willing to tolerate. Finally, it should be soon apparent to the thief that even a successful high-risk assault on the trailer hitch additionally presents so great a risk that the hitch will probably be damaged so as to be unusable, that, on balance, he is dissuaded from making the assault.

As self-evident as the foregoing observations may appear, it is apparent that they are not always used as the principal guiding tenets in the design of most prior art locking devices for trailer hitches or trailer couplings. A padlock clearly does not afford more than a modicum of invulnerability, and the challenge it presents can generally be gauged by a casual visual assessment. Plugs present a greater challenge because it is not immediately apparent that they conceal a locking device, as for example the plug of U.S. Pat. No. 3,810,664, but such a plug is relatively expensive to manufacture and requires specialized tooling to do so. The simple fact is that in their enthusiasm to provide diverse locking means for trailer hitches, those skilled in the art have overlooked some concepts of locking a hitch, one of which concepts, adequately embodied in suitable structure, provides a locking device which is as effective as it is simple in operation, and inexpensive to manufacture. This invention provides a locking means based on the simple concept that a hardened steel bolt concealed within a ball, is a highly effective deterrent for a trailer thief.

SUMMARY OF THE INVENTION

It has been discovered that a concealed modification of an apparently conventional ball for a typical coupling of the ball-and-socket type trailer hitch, provides a locking-ball device of the utmost simplicity, ruggedness, reliability and effectiveness, without resorting to specialized tooling to manufacture the device.

It is therefore a general object of this invention to provide a locking-ball for a trailer coupled to its tow vehicle when they are parked; and, to provide a locking-ball for a trailer hitch of the lever type, when the trailer hitch is uncoupled from its tow vehicle; so that, in either case, a prospective thief cannot tow the trailer by using a ball on his own tow vehicle in the locked trailer hitch.

It is also a general object of this invention to provide a locking means which presents no immediate visual indication that the hitch is locked, or that the apparently conventional coupling has been modified in any way; and, which locked hitch, even upon a close visual inspection provides no indication of how the locking means may be defeated.

It is a specific object of this invention to provide a locking device for a trailer hitch of the lever type in which device a threadened hardened steel member is threadedly disposed for vertical axial movement relative to a modified ball held within the trailer hitch's socket.

It is also a specific object of this invention to provide a novel combination of a modified ball which is locked within a lever type trailer hitch in such a way that the lever in turn is locked in position without the benefit of any readily visible means.

It is yet another object of this invention to provide a key means with an individual profile, which key means may be inserted into a cavity having a mating profile in the lower end of the threaded member, so that only a specific key means is effective to turn the steel member.

These and other objects and advantages of the invention will be apparent to those skilled in the art from the following detailed description of the best modes of carrying out the invention, and the manner of making and using the same, as evidenced by preferred embodiments thereof illustrated in the accompanying drawings.

BRIEF DESCRIPTION OF THE DRAWINGS

FIG. 5 is a vertical cross sectional view along the longitudinal axis, of one embodiment of a hitch of the lever type, such as is conventionally carried on a trailer to be towed by a tow-vehicle, which vehicle is equipped with a locking-ball, shown in the unlocked position, and inserted in the hitch's socket with the threaded bolt retracted.

FIG. 6 is a vertical cross sectional view along a longitudinal axis, of the hitch shown in FIG. 5, in which is inserted a locking-ball, used as a plug, and the threaded bolt is advanced vertically upward so as to be forced against the inner wall of the hitch's socket, and lock the hitch.

DETAILED DESCRIPTION OF PREFERRED EMBODIMENTS

Figures 1, 2:
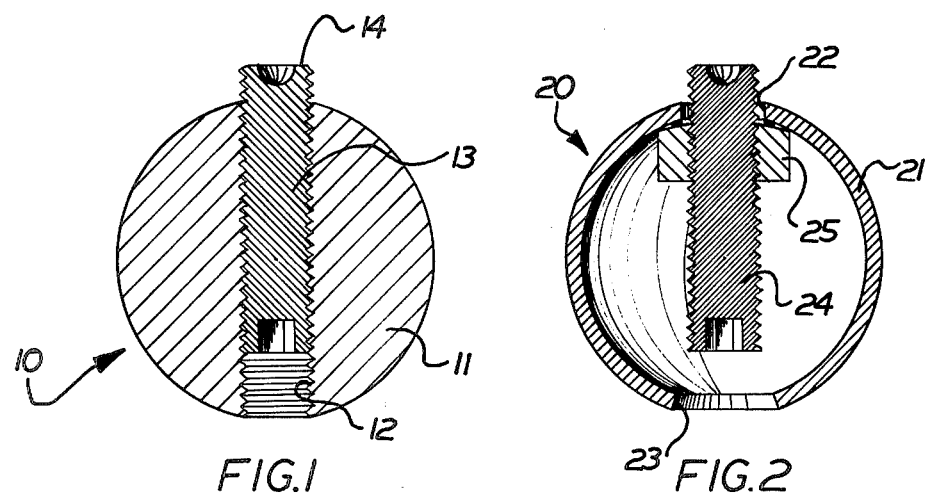
FIG. 1 is a vertical cross sectional view of one embodiment of a modified ball used to lock a trailer hitch of the lever type, showing a solid sphere with a bolt threaded diametrically therethrough.
FIG. 2 is a vertical cross sectional view of another embodiment of a modified ball showing a hollow spherical shell with a bolt threaded through a nut welded to the upper inner surface of the shell coaxially with diametrically opposite passages.

As indicated hereinbefore, this invention is based on a concept of utmost simplicity which has been heretofore overlooked. There are a great variety of trailer couplings, and this invention is concerned only with those of the lever type. The term coupling is used herein to denote both the ball-type connector and the trailer hitch in combination. The term "trailer hitch" or simply "hitch" is used to refer specifically to that portion of the coupling which is normally carried by the trailer. The hitch includes a generally inverted U-shaped channel portion, open at the bottom, having a socket in one end to snugly accomodate the ball. The other end of the hitch typically fits over a projecting frame member of the trailer. One embodiment of a lever-type trailer hitch is disclosed in U.S. Pat. Nos. 3,237,969 and 3,391,555, the disclosures of which are incorporated by reference herein for the purpose of describing the trailer hitch, as if fully set forth.

Trailer hitches of the type referred to as being of the "lever type" use a lever to actuate a cam which in turn can lock a jaw against the ball when the ball is inserted in the hitch's socket. The lever is usually pushed into the "down" position to lock the ball in the socket to permit the trailer to be towed. A detent is normally provided for the lever, to ensure that it stays in the "down" position, and that it does not unexpectedly release the ball in the socket while the trailer is being towed. If a detent is not provided, the lever may be tied in its "down" position with a cable or other tie-down means. In some lever type hitches the lever is moved to one side of the longitudinal axis of the hitch to release the ball, and pushed to the center coincident with the longitudinal axis, to lock the ball in place for towing. Those with a knowledge of trailer hitches of the lever type, understand that when a conventional ball-type connector in a tow vehicle is used to tow a socket-type trailer hitch, the ball is locked in the socket in such a way that it is securely held therein so that the trailer hitch can move around the ball, specifically for example, when the trailer must follow the tow vehicle around a corner. When the trailer is to be uncoupled from the tow vehicle, the lever is then raised, or moved to the side as the case may be, and the ball is released. Typically, prior to raising the lever (say), it is necessary to release the detent on the hitch.

In view of the fact that a conventional ball is already securely held in the hitch's socket when the lever is raised to release the jaw holding the ball, it is surprising that the ball may also be biased within the socket with sufficient force that, though the detent may be released, the lever cannot be moved. With this sufficient force the cam against the jaw cannot be removed, and the ball cannot be released in the socket. Perhaps this conceptual basis of locking a trailer hitch is all the more unexpected because one who is familiar with the operation of a hitch would not suspect that a conventional ball may be snugly held in the socket, yet be released with the lever; and, a ball of the same spherical configuration may also be held in the socket by the same jaw, yet, as a locking-ball, not be released with the same lever.

The manner in which a trailer hitch of the lever type is disabled may best be understood by a detailed examination of the locking-ball of this invention which is illustrated in FIG. 1. The locking-ball, indicated generally by the reference numeral 10, comprises a substantially spherical portion 11 which is solid except for a diametrical threaded passage 12 in which is threadedly disposed a hardened steel bolt 13. As illustrated, for simplicity, the bolt 13 is shown as an Allen head bolt which may be rotated by inserting a conventional Allen wrench of the proper size which is snugly mated to the cavity in the head of the bolt. The bolt 13 is necessarily no longer than the length of the passage 12, to ensure that the head of the bolt may not protrude from the bottom of passage 12, and be turned. The bolt may be rotated with an Allen wrench inserted in passage 12 so that the bolt's upper end 14 can protrude from the upper surface of the sphere 11.

Since a solid sphere is not economical, it is more preferred, as illustrated in FIG. 2, to use a modified locking-ball, indicated generally by reference numeral 20, which is a hollow, substantially spherical shell 21 in which is provided diametrically oppositely disposed passages 22 and 23 near the top and bottom of the sphere respectively. If the thickness of the shell is substantial, passage 22 may be threaded to threadedly accomodate a hardened steel bolt 24, which again, for simplicity is depicted as an Allen head bolt. Passage 23 is wide enough to permit the insertion of an Allen wrench into the head of the bolt, to advance the bolt upward, or to retract it downward. It is essential that the passage not be so wide that a long nose pliers or similar instrument, may be inserted therethrough to grip and turn the bolt 24, and again, as in the embodiment shown in FIG. 1, it is essential that the length of the Allen head bolt be such as not to protrude from the lower passage 23 sufficiently to be gripped by an instrument and rotated in passage 22. If the spherical shell is relatively thin, a nut 25 is welded to the inner surface of the shell 21 coaxially with passage 22, so that threaded bolt 23 may be threadedly advanced and retracted through the nut.

Figure 3:
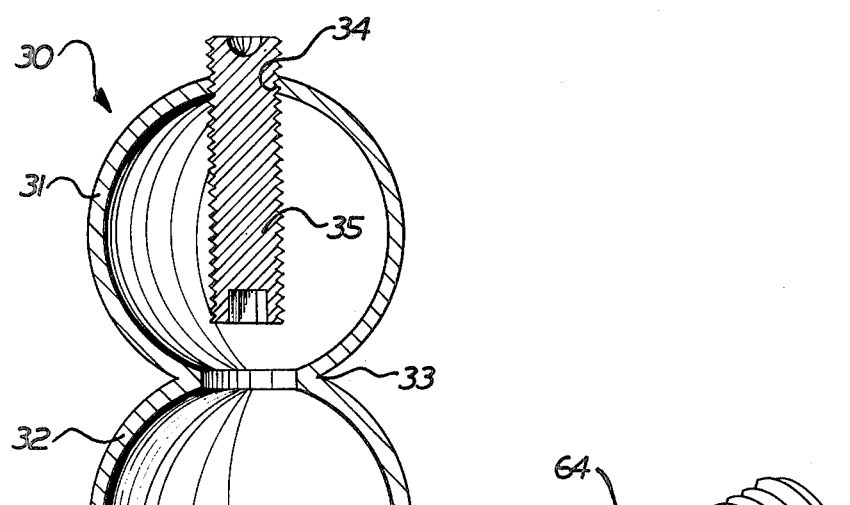
FIG. 3 is a vertical cross sectional view of still another embodiment of a locking-ball having an upper hollow spherical portion, a skirt flaring outward from beneath the upper portion, and a bolt threadedly disposed in the wall of the upper portion, near its top.

From a practical point of view, for convenience of handling, and also to prevent unwanted rotation of the ball when it is used to lock a trailer hitch, it is most preferred, as shown in FIG. 3, to provide a locking-ball, indicated generally by reference numeral 30, having an upper spherical shell portion 31 and a lower skirt 32, flaring outward from the constriction 33 near the bottom of the shell 31. The shell 31 is provided near the top with a passage 34, which, if the shell is relatively thick, is threaded to threadedly accept a hardened steel bolt 35. As before, the bolt is illustrated as a conventional Allen head bolt. If the shell is relatively thin, then a nut (not shown in this FIG. 3), is welded to the inner surface of the shell, as described hereinabove for FIG. 2. The constriction 33 is preferably only wide enough to permit the insertion of an Allen wrench to fit the head of the bolt 35, and for the same reason as stated hereinbefore, the length of the bolt is no greater than about the diameter of the shell 31, so that there is very little, if any, portion of the head bolt, protruding through the constriction 33. Neither the shape nor the dimensions of the skirt are critical to the operation of the locking-ball as a locking means in the trailer hitch, but it will also be apparent that the skirt should not be so long as to be easily beaten upon with a hammer, or the like. Skirt 32 facilitates handling the locking-ball, serves to further conceal the bolt 35, and prevents unwanted rotation of the ball while it is being placed in operation to serve its locking function.

Figure 4:
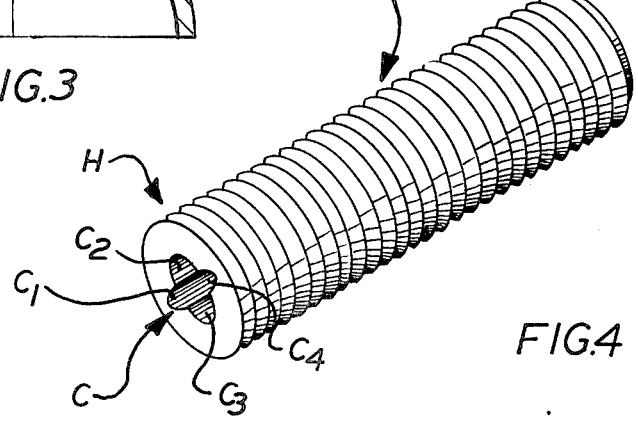
FIG. 4 is a detail, in perspective view, of a four-leaf clover shaped cavity in the head of the bolt which provides the locking action of the locking-ball.

Referring now to FIG. 4 there is shown a detail perspective view of one embodiment of a head H of the threaded bolt used in the locking-ball. In this embodiment the head H is provided with a four-leaf clover-shaped recess C, having cusps $C_1$, $C_2$, $C_3$ and $C_4$. Each cusp has a slightly different arcuate profile, so that only a wrench with a closely mating profile may be inserted into the cavity. Thus, only the person who uses the wrench can rotate the bolt. It will be recognized of course, that an Allen head bolt of relatively large size, say 0.375 in., or a Metric Allen wrench, preferably a large one about 10 mm., is not commonly carried, and would in many instances be an adequate protection. However, it is preferred to make the wrench as unique as possible, so that the chances of one not possessing the correct wrench, to operate the locking-ball, are extremely remote. Bolts with cylindrical heads having four-leaf clover-shaped cavities are well-known in the art, and known machines cut random cusp profiles in the head. Such bolts are commonly used to lock an automobile or truck wheel. Alternatively, a random cusp cavity is cut in a cylindrical nut, such as a lug nut used to mount a wheel on the axle of an automobile.

Referring now to FIG. 5, there is shown a cross sectional view of a hitch, indicated generally by reference numeral 40, in which the locking-ball, indicated generally by reference numeral 30, the skirt 32 of which is welded to a frame member 60 of the tow vehicle (not shown). The frame member 60 is provided with a passage 61 coaxial with the vertical axis of the locking-ball 30, which passage is just large enough to slidably accomodate a key means 62, one end of which is desirably provided with a butterfly 63, or optionally, a hexagonal head, the other end being formed to snugly mate with the recess C of the head H of the threaded bolt 64.

The trailer hitch shown in FIG. 5 is commercially available as the Big Boy Coupler, and is one of several embodiments of a lever-type trailer hitch currently in use. The hitch 40 comprises an elongated generally U-shaped channel portion 41 having a spherical socket 42 in one end, the inner surface 42' of which is shaped to fit the locking-ball 30. The other end 43 fits over a protruding frame member 51 of the trailer to be towed, and aligned, opposite passages 44 and 45 are provided in the down-turned flange portions of the channel 41, which passages in cooperation with alignable through-passages in the frame member 51 accomodate bolts (not shown) which lock the hitch to the frame member. Within the channel 41 of the hitch, there is provided a pin 46 loosely inserted through the roof of the channel member, so that the head of the pin 46 rests on the surface of the channel member. The lower end of the pin is threaded to receive a nut 47 which holds a jaw 48 on the pin. A biasing spring 49 between the lower surface of the roof of the channel portion and the jaw 48, biases the jaw 48 against the nut 47. The jaw 48 is a generally trapezoidal member, which in cross section as shown, presents an arcuate ball-engaging surface 52, and a cam-engaging surface 53. A cam means 54 is pivotably disposed on pivot pin 55, so that when lever 56 is raised the cam 54 is forced against the cam-engaging surface 53 of jaw 48, biasing the jaw against spherical shell 31 of the locking-ball 30. A detent 58 is provided which prevents lever 56 from being raised accidentally.

As illustrated, the upper end of the threaded bolt 64 is not in contact with the inner surface 42' of the socket 42, and the lever 56 is in the "down" position, exerting a camming action against the jaw 48, and snugly holding locking-ball 30 in the socket 42. Since the threaded bolt is not in contact with the inner surface 42' of the socket 42, there is no biasing force exerted by the bolt, and the lever 56 can be raised to uncouple the locking-ball 30 from the trailer hitch 40. When the bolt 64 is forced against the inner surface 42' of the socket 42, as shown in FIG. 5 herein, and described in more detail hereinbelow, sufficient force is exerted against the jaw 48 so as to prevent the lever from being raised, though the detent 58 is released.

Referring now to FIG. 6, there is shown the trailer hitch described in FIG. 5, fitted with a locking-ball 30, which functions as a plug after the trailer hitch is uncoupled from the tow-vehicle. Assuming one has a locking-ball either (a) welded to a frame member of the tow vehicle, as described in FIG. 5, or (b) formed with a threaded projection so that it can be bolted to the frame member, as is conventionally done, it is desirable to have another locking-ball which can be used as a plug when it is desired to use the tow vehicle but leave the trailer parked. In FIG. 6, as illustrated, the threaded bolt 64 is forced against the inner surface 42' of the socket 42 after the lever 56 snugly holds the locking-ball in place. The biasing force exerted by the threaded bolt 64 now tightly and immovably holds the locking-ball in the socket. If detent 58 is released, which it can be, since there is no force preventing its release, the lever 56 still cannot be raised. The force exerted by the locking-ball biased in the socket 42, jams the jaw 48 against the cam 54 preventing the lever from being raised. Excessive force on the lever, for example, by inserting a crow bar under the lever and bending it, results in damage to the hitch mechanism so that it cannot be used to tow the trailer without undue risk that it will become uncoupled from the tow vehicle during operation.

From the foregoing description it will now be evident that, prior to towing the trailer again, it is essential that the threaded bolt 64 be retracted so that it no longer exerts its biasing action against the inner surface 42'. It will also be evident that a concept of utmost simplicity has been utilized to provide a locking device which itself is simple. It is not only simple in operation, it is immune to freezing up in icy weather, does not require skill to operate, nor large expense to manufacture, yet is so well-concealed that even an expert thief will be induced to leave it alone.

I claim:

1. In a trailer coupling which includes a ball-type connector carried by a tow vehicle, and an apparently unprotected trailer hitch carried by the trailer, said trailer hitch being of the lever type, and having an elongated channel portion, with a socket in one end, in which channel portion a cam means is disposed for actuation against a jaw by said lever, and said jaw in cooperation with said socket snugly holds said ball in position, the improvement comprising, a locking-ball means removably disposed within said socket, said locking-ball means comprising,
 (i) a substantially spherical shell having no visible locking means,
 (ii) a hardened steel bolt threaddedly disposed for vertical axial movement in said spherical shell so as to exert, with said bolt's upper end, a biasing force against the inner surface of said socket, whereby sufficient force is exerted by said shell against said inner surface so that said lever is locked in position, said bolt's lower end being adapted to matingly receive an end of
 (iii) a key means introduced from under said spherical shell, said key means when mated to said bolt's lower end being effective to rotate said bolt into, and out of biasing engagement with said inner surface of said socket.

2. The locking-ball means of claim 1 including a skirt flaring outwardly from beneath said spherical ball.

3. The locking-ball means of claim 1 wherein said hardened steel bolt when biased against said inner surface of said socket, does not protrude from beneath said sphere sufficiently to enable said lower end to be gripped and rotated.

4. The locking-ball means of claim 3 wherein said lower end of said bolt is recessed to form a cavity in which said key means is uniquely, closely fitted.

5. The locking-ball means of claim 1 wherein said spherical ball is a spherical shell.

6. The locking-ball means of claim 5 wherein said spherical shell has a relatively thick wall which threaddedly accomodates said hardened steel bolt.

7. The locking-ball means of claim 5 wherein said spherical shell has a nut bonded to its inner surface, and said hardened steel bolt is threaddedly disposed in said nut so as to be rotatably advanced through the upper surface of said spherical shell.

* * * * *